Jan. 3, 1967 P. D. PAGE ETAL 3,295,737
TRAY
Filed Sept. 15, 1965 2 Sheets-Sheet 1
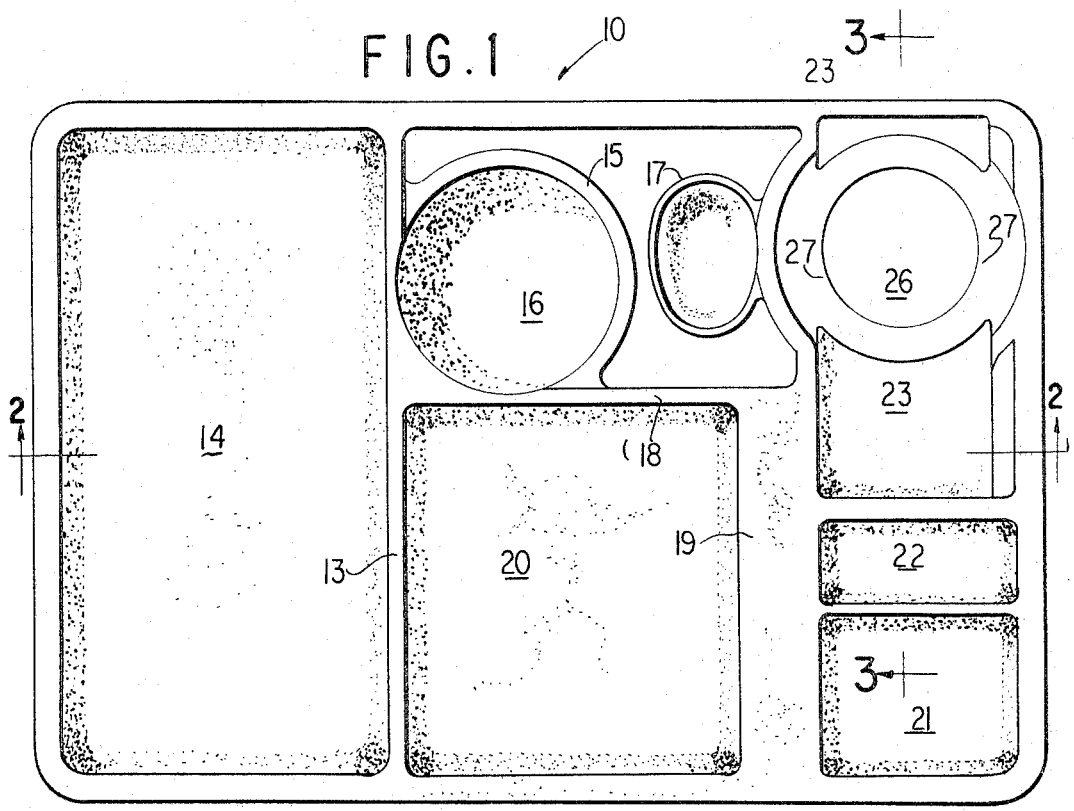
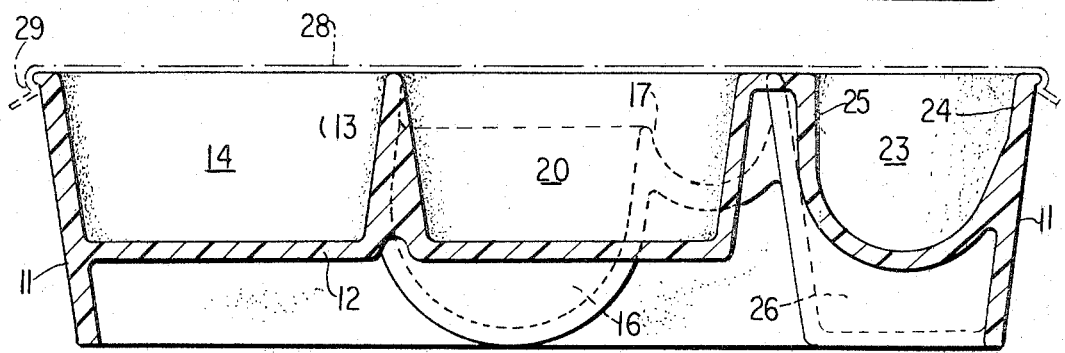
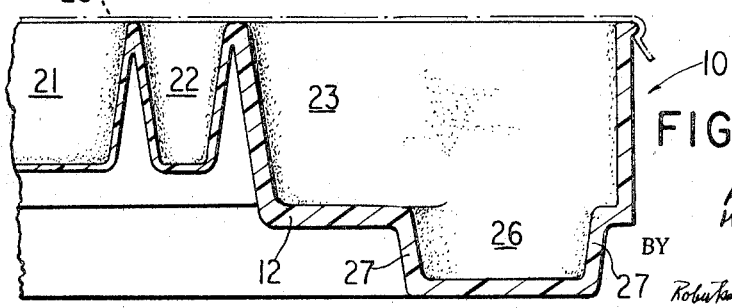
INVENTORS
PHYLLIS D. PAGE
WILLIAM C. PAGE
BY
Robertson Smyth Bryan Parmelee
ATTORNEYS Jan. 3, 1967    P. D. PAGE ETAL    3,295,737
TRAY
Filed Sept. 15, 1965    2 Sheets-Sheet 2
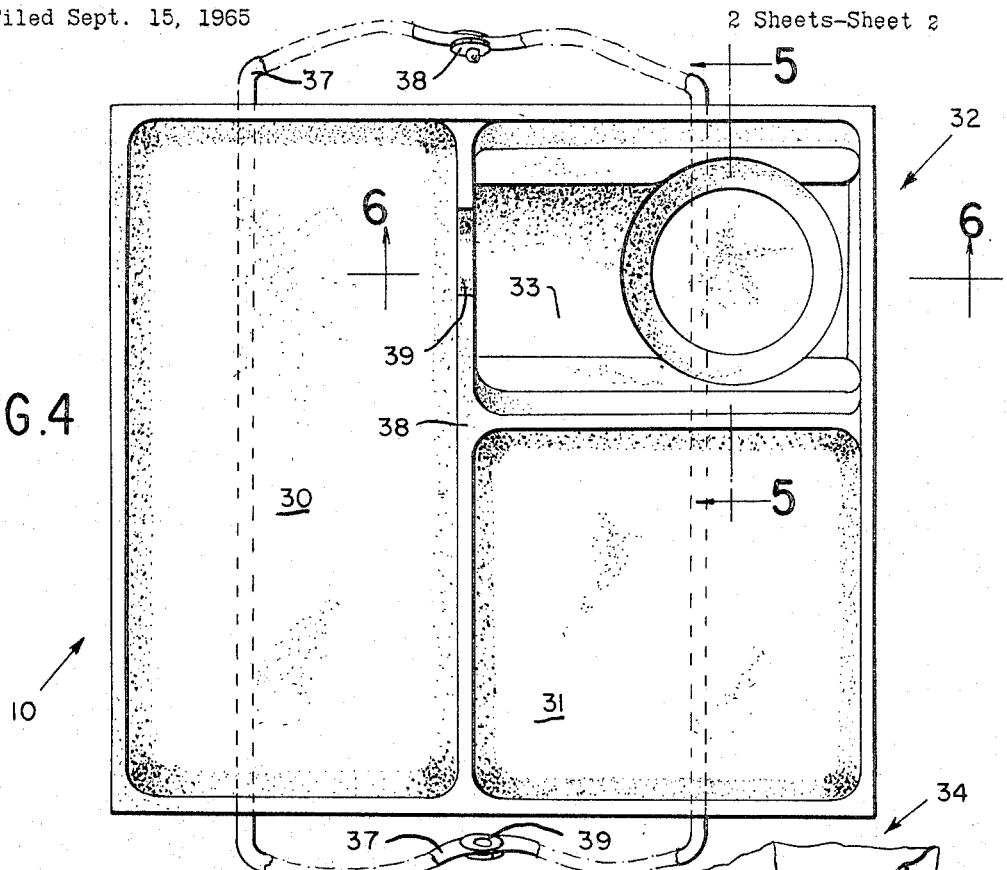
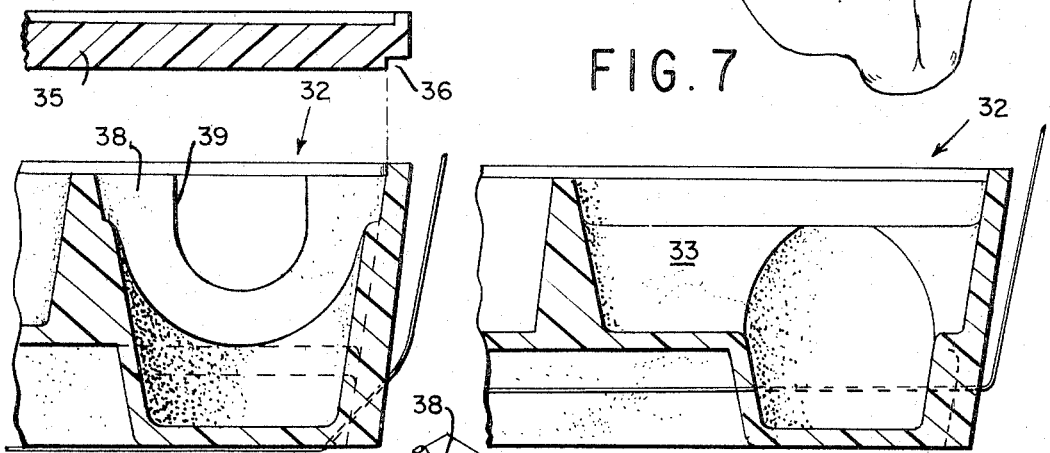
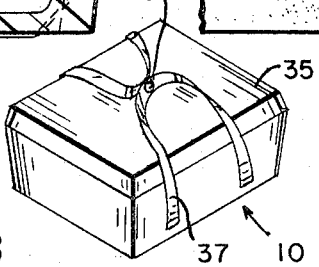
INVENTORS
PHYLLIS D. PAGE
WILLIAM C. PAGE
BY
Robinson Smythe Byen & Parmelee
ATTORNEYS 3,295,737
TRAY
Phyllis D. Page and William C. Page, both of 19850 W.
Dixie Highway, North Miami Beach, Fla. 33160
Filed Sept. 15, 1965, Ser. No. 487,494
11 Claims. (Cl. 229—2.5)

This invention relates to serving trays and particularly to an improved serving tray of the type employed on public and private transportation equipment such as airplanes, buses, boats, automobiles, trains and the like.

Meals are regularly served on airplanes today, and space requirements demand that the entire meal, with the exception of the beverage, be located in compartments of a tray; that the trays be of a limited overall height; and that they have the capability of being easily stacked one on top of the other without toppling. Such features are likewise required by vending machines, catering services, take-out service, and institutions including nursing homes, hospitals and schools.

The principal object of this invention is to provide a compartmented food tray having provision for a canned beverage in a horizontal as well as an upright position.

Another object of the invention is to provide such a tray in which the two positions of the canned beverage are coincident, i.e., the upright position consumes a portion of the compartment accommodating the can in a horizontal position.

Still another object of the invention is to provide such a tray in which the compartment for the horizontal position of the beverage container receives the latter in a manner such that it lies below the top of the tray.

Still another object of the invention is to provide such a tray that is made from expanded polystyrene foam or the like. This material is produced as free-flowing beads containing an expanding agent. When exposed to heat, the beads will expand to over 60 times their original volume.

Another object of the invention is to provide such a tray and a cover therefor adapted to be clipped onto the edges thereof. Alternatively, the cover may have ribs fitting into the sloped sides of the outer compartments.

Still another object of the invention is to provide such a tray in which the compartment for accommodating the canned beverage in upright position also accommodates a bottle or a cup for a hot beverage, and has an optional slot for an aluminum dish insert.

In one aspect of the invention, a food spray may comprise a body portion having side walls that slope downwardly and inwardly so that the trays can be stacked on top of each other. Various recessed compartments may be formed in the tray body having different depths depending upon the food intended to be received therein.

In another aspect of the invention, an elongated compartment may be provided that is capable of receiving a canned beverage in horizontal position.

In still another aspect of the invention, the depth of the canned beverage compartment may be greater than the diameter of the can of beverage so that when lying in horizontal position within its compartment, the can will not extend above the top of the tray and hence will not interfere with the stacking of filled trays one on top of the other.

In still another aspect of the invention, a circular recess may be provided within the confines of the elongated canned beverage compartment. The recess may extend beneath the bottom of the elongated compartment and provide a receptacle for holding the beverage container in an upright position.

In a still further aspect of the invention, the circular recess may be arranged alternatively to receive a cup for a hot beverage.

The above, other objects and novel features of the invention will become apparent from the following specification and accompanying drawings which are merely exemplary.

In the drawings:

FIG. 1 is a top plan view of a tray to which the principles of the invention have been applied;

FIG. 2 is a sectional view taken substantially along line 2—2 of FIG. 1;

FIG. 3 is a sectional view taken substantially along line 3—3 of FIG. 1;

FIG. 4 is a modified form of the invention;

FIG. 5 is a sectional elevational view taken substantially along line 5—5 of FIG. 4;

FIG. 6 is a sectional elevational view taken substantially along line 6—6 of FIG. 4;

FIG. 7 is a foil bag for containing food; and

FIG. 8 is a reduced size perspective view showing the carrying straps.

Referring to the drawings, the principles of the invention are shown as applied to a tray 10 which may be made of one of the modern plastics such as expanded polystyrene or the like. Expansible polystyrene is produced as free-flowing beads containing an expanding agent. When exposed to heat, these beads will expand to over sixty times their original volume. This foam provides a closed cell structure of controllable density, low thermal conductivity, low water absorption, low water vapor permeability, toughness and dimensional stability up to 185° F.

The tray 10 may include downwardly inclined side walls 11 integral with a bottom 12 having an overall dimension less than the top of the tray to facilitate stacking of the trays one on top of the other.

Tray 10 may include a wall 13 extending between opposite side walls 11, forming a compartment 14 that may be used to accommodate bulky foods such as potato chips and the like contained within a bag, or chicken in foil wrapping. A curvilinear wall 15 may surround a recessed compartment 16 for receiving fruit and the like, while an elliptical wall 17 may surround a compartment for holding an egg.

Still other walls 18 and 19 may form a compartment 20 for a sandwich, meat or vegetable, and compartments 21 and 22 may be provided for cream and seasoning.

For the reception of a can or bottle of beverage, an elongated compartment 23 may be provided. Referring to FIG. 2, compartment 23 may be substantially semicylindrical in form with side walls 24 and 25 extending upwardly therefrom. The radius of the semicylindrical portion is such that it will receive a can of beverage in horizontal position, and the height of side walls 24, 25 is such that the can of beverage in horizontal position lies below the top of the tray 10.

In order to accommodate the canned beverage in upright position, after it has been opened, and in a manner preventing its overturning, a circular recess 26 may be superimposed upon the semicylindrical recess 23 with its axis at right angles to the axis of the compartment or semicylindrical recess 23. The diameter of the bottom of recess 26 is such as to receive the canned beverage in upright position within walls 27 forming circular recess 26. Additionally, the walls 27 may be tapered upwardly and outwardly so that the circular recess 26 can alternatively receive a cup for a hot beverage or soup, or dessert or fruit in a dish insert.

Referring to FIG. 2, a cover 28 may be made of sheet material or of expanded polystyrene (for longer insulating time), and may include clip means 29 along its edges for cooperating with the top edges of the tray 10.

Referring to FIGS. 4 to 7, inclusive, a modified form of the invention is shown. In the embodiment illustrated in FIGS. 4 to 7, the compartment 30 is similar to compartment 14 of FIG. 1. The compartment 31 is similar to compartment 20. The compartment 32 is similar to compartment 23, 26, but includes a portion 33 at right angles to the portion 23 of FIG. 1. As shown, portion 23 may carry a can, cup or dish-type foil insert of the type shown at 34 of FIG. 7, which would follow the contours of compartment 32.

A removable lid 35 may have a step 36 adapted to mate with the open end of tray 10. Strap means 37 may be attached to the bottom of tray 10 as shown in FIG. 4, and clasps 38 and 39 on strap means 37 may be employed to hold the lid 35 in place and also to provide a convenient carrying handle such as seen in FIG. 8. Wall 38 may have a slot 39 cut therein to receive the neck of a bottle placed with its axis along the line 6—6 of FIG. 4.

Although the various features of the improved compartmented tray have been shown and described in detail to fully disclose two embodiments of the invention, it will be evident that changes may be made in such details and certain features may be used without others without departing from the principles of the invention.

What is claimed is:

1. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; and walls within the confines of said semicylindrical compartment, defining a circular recess for receiving said beverage container in upright position.

2. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; and walls within the confines of said semicylindrical compartment, defining a circular recess for receiving said beverage container in upright position, said circular walls being tapered inwardly and downwardly, whereby said circular recess alternatively may support a cup for a hot beverage.

3. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position; and a sheet material lid having clip means along its edges for securing it to the top of said tray.

4. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position, said circular walls being tapered inwardly and downwardly, whereby said circular recess alternatively may support a cup for a hot beverage; and a sheet material lid having clip means along its edges for securing it to the top of said tray.

5. A compartmented food tray made from polystyrene foam and comprising a bottom portion integral with upstanding side walls forming compartments within said tray for containing food; other side walls of said tray forming a semicylindrical compartment adapted to receive a beverage container in horizontal position such that it lies below the top of the tray; and walls within the confines of said semicylindrical compartment, defining a circular recess for receiving said beverage container in upright position.

6. A compartmented food tray made from polystyrene foam and comprising a bottom portion integral with upstanding side walls forming compartments within said tray for containing food; other side walls of said tray forming a semicylindrical compartment adapted to receive a beverage container in horizontal position such that it lies below the top of the tray; and walls within the confines of said semicylindrical compartment, defining a circular recess for receiving said beverage container in upright position, said circular walls being tapered inwardly and downwardly, whereby said circular recess alternatively may support a cup for a hot beverage.

7. A compartmented food tray made from polystyrene foam and comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position; and a sheet material lid having clip means along its edges for securing it to the top of said tray.

8. A compartmented food tray made from polystyrene foam and comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position, said circular walls being tapered inwardly and downwardly, whereby said circular recess alternatively may support a cup for a hot beverage; and a sheet material lid having clip means along its edges for securing it to the top of said tray.

9. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position, said circular walls being tapered inwardly and downwardly, whereby said circular recess alternatively may support a cup for a hot beverage; a removable lid placeable on the top of said tray; and strap means extending along and over said lid for assisting in holding said lid in place.

10. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray; walls within the confines of said semicylindrical compartment, defining a circular recess for receiving said beverage container in upright position, said circular walls being tapered inwardly and downwardly, whereby said circular recess alternatively may support a cup for a hot beverage; a removable lid placeable on the top of said tray; and strap means extending along and over said lid for assisting in holding said lid in place, said strap means having separable clasps thereon.

11. A compartmented food tray comprising a bottom portion integral with upstanding side walls forming compartments within said tray for containing food; other side walls of said tray forming a semicylindrical compartment adapted to receive a beverage container in horizontal position such that it lies below the top of the tray, at least one of said other side walls having a slot therein for receiving an elongated portion of said beverage container; walls within the confines of said semicylindrical compartment, defining a circular recess for receiving said beverage container in upright position; and a sheet material lid having clip means along its edges for securing it to the top of said tray.

References Cited by the Examiner

UNITED STATES PATENTS

| | | | |
|---|---|---|---|
| 2,766,919 | 10/1956 | Randall | 206—72 X |
| 2,878,128 | 3/1959 | Jorgenson | 99—192 |
| 2,975,931 | 3/1961 | Harrison | 220—24 |
| 3,107,027 | 10/1963 | Hong | 229—2.5 X |
| 3,122,265 | 2/1964 | Innis | 206—72 X |
| 3,217,961 | 11/1965 | Hornbostel | 229—2.5 |

GEORGE O. RALSTON, *Primary Examiner.*